(12) United States Patent
Faruque et al.

(10) Patent No.: US 10,442,384 B2
(45) Date of Patent: Oct. 15, 2019

(54) ENERGY-ABSORBING KNEE BOLSTER

(71) Applicant: Ford Global Technologies, LLC, Dearborn, MI (US)

(72) Inventors: Mohammad Omar Faruque, Ann Arbor, MI (US); Robert William McCoy, Ann Arbor, MI (US); James Chih Cheng, Troy, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 15/485,814

(22) Filed: Apr. 12, 2017

(65) Prior Publication Data

US 2018/0297546 A1    Oct. 18, 2018

(51) Int. Cl.
| | | |
|---|---|---|
| *B60R 21/045* | (2006.01) | |
| *B60R 21/04* | (2006.01) | |
| *B60R 21/055* | (2006.01) | |
| *B60R 21/00* | (2006.01) | |
| *B60R 21/02* | (2006.01) | |

(52) U.S. Cl.
CPC ............ *B60R 21/045* (2013.01); *B60R 21/04* (2013.01); *B60R 2021/0051* (2013.01); *B60R 2021/0273* (2013.01); *B60R 2021/0407* (2013.01)

(58) Field of Classification Search
CPC ..... B60R 21/04; B60R 21/045; B60R 21/055; B60R 2021/0051; B60R 2021/0273; B60R 2021/0407
See application file for complete search history.

(56) References Cited

U.S. PATENT DOCUMENTS

| | | | | |
|---|---|---|---|---|
| 4,951,963 | A | * | 8/1990 | Behr ....................... B60R 21/02 280/752 |
| 5,875,875 | A | | 3/1999 | Knotts |
| 6,846,015 | B2 | | 1/2005 | Meduvsky et al. |
| 7,240,920 | B2 | | 7/2007 | Motozawa et al. |
| 8,997,951 | B2 | * | 4/2015 | Suciu ....................... F16F 9/003 188/266.1 |
| 9,174,600 | B1 | * | 11/2015 | Jayasuriya ............ B60R 21/206 |
| 10,094,441 | B2 | * | 10/2018 | Abensur ................ F16F 9/003 |
| 2003/0010587 | A1 | | 1/2003 | Eroshenko |

(Continued)

FOREIGN PATENT DOCUMENTS

| | | |
|---|---|---|
| CN | 104228622 A | 12/2014 |
| CN | 104228955 A | 12/2014 |

(Continued)

OTHER PUBLICATIONS

Search Report from United Kingdom Intellectual Property Office dated Sep. 28, 2018 regarding Application No. GB1805889.1 (4 pages).

*Primary Examiner* — Barry Gooden, Jr.
(74) *Attorney, Agent, or Firm* — Frank A. MacKenzie; Bejin Bieneman PLC

(57) ABSTRACT

A vehicle component may include a crossbeam, a cylinder, a piston, a panel, and a heterogeneous mixture. The cylinder has a chamber and is fixed relative to the crossbeam. The piston is linearly movable in the chamber. The panel is fixed relative to the piston. The heterogeneous mixture is enclosed by the piston in the chamber. The heterogeneous mixture includes hydrophobic nanoporous particles and a liquid.

12 Claims, 4 Drawing Sheets

(56) References Cited

U.S. PATENT DOCUMENTS

| | | | |
|---|---|---|---|
| 2004/0046377 A1* | 3/2004 | Meduvsky | B60R 21/02 |
| | | | 280/752 |
| 2004/0169363 A1 | 9/2004 | Fukawatase et al. | |
| 2004/0251670 A1 | 12/2004 | Wang et al. | |
| 2011/0012329 A1 | 1/2011 | Sekino et al. | |
| 2018/0297546 A1* | 10/2018 | Faruque | B60R 21/055 |
| 2018/0319362 A1* | 11/2018 | Faruque | B60R 22/341 |
| 2018/0319363 A1* | 11/2018 | Faruque | B60R 22/405 |
| 2018/0319364 A1* | 11/2018 | Faruque | B60R 22/4633 |
| 2018/0326940 A1* | 11/2018 | Faruque | B60R 22/28 |

FOREIGN PATENT DOCUMENTS

| | | |
|---|---|---|
| DE | 4002448 A1 | 8/1990 |
| DE | 102004063741 A1 | 10/2006 |
| GB | 2511382 A | 9/2014 |
| JP | 2005280465 A | 10/2005 |
| RU | 111598 U | 12/2011 |
| WO | WO 2008144111 A1 | 11/2008 |

* cited by examiner

ENERGY-ABSORBING KNEE BOLSTER

BACKGROUND

A knee bolster is a lower portion of an instrument panel in a vehicle. The knee bolster is often made of padded structures to absorb energy during a vehicle impact when a knee of an occupant impacts the knee bolster. The knee bolster is typically positioned far enough from a seat to provide sufficient legroom to the occupant, but the knee bolster is also positioned close enough to provide protection during an impact. In the event of a vehicle impact, the knee bolster may prevent "submarining," that is, when the occupant slides down the seat, which may reduce the effectiveness of other safety features, such as seatbelts and airbags.

DETAILED DESCRIPTION

A vehicle component may include a crossbeam, a cylinder, a piston, a panel, and a heterogeneous mixture. The cylinder has a chamber and is fixed relative to the crossbeam. The piston is linearly movable in the chamber. The panel is fixed relative to the piston. The heterogeneous mixture is enclosed by the piston in the chamber. The heterogeneous mixture includes hydrophobic nanoporous particles and a liquid.

The particles have nanopores, and the piston may be movable from the first position in which the nanopores are substantially filled with air to a second position in which the nanopores are substantially filled with the liquid. Additionally, a volume of the heterogeneous mixture when the piston is in the second position may be at most half of a volume of the heterogeneous mixture when the piston is in the first position.

The heterogeneous mixture may be a colloid of hydrophobic nanoporous particles in a liquid.

The particles may be formed of silica. Additionally, the particles may have a hydrophobic surface treatment.

The cylinder may be attached to the crossbeam.

The vehicle component may include an instrument-panel cover fixed relative to the crossbeam, and the cylinder may be disposed below the instrument-panel cover.

The vehicle component may include a seat, and the panel may be disposed between the piston and the seat.

The panel may be attached to the piston.

The cylinder may have an orifice between the chamber and a space outside the cylinder. The orifice may block the liquid in the chamber from passing through the orifice when the liquid is below a pressure threshold. The orifice may allow the liquid in the chamber to pass through the orifice when the liquid is above the pressure threshold. The pressure threshold may be greater than a pressure required to compress the heterogeneous mixture to half its original volume. The cylinder may have a tube and a wall at an end of the tube, and the orifice may be in the wall.

The vehicle component may limit the risk of submarining while also limiting the amount of reaction force imparted to a knee of an occupant of the vehicle. The panel can be positioned to prevent submarining by blocking the knee of the occupant from moving forward during an impact. The heterogeneous mixture in the chamber can allow the panel to move forward at an approximately constant force, rather than the knee experiencing increasing resistance with greater forward travel.

Figure 1:
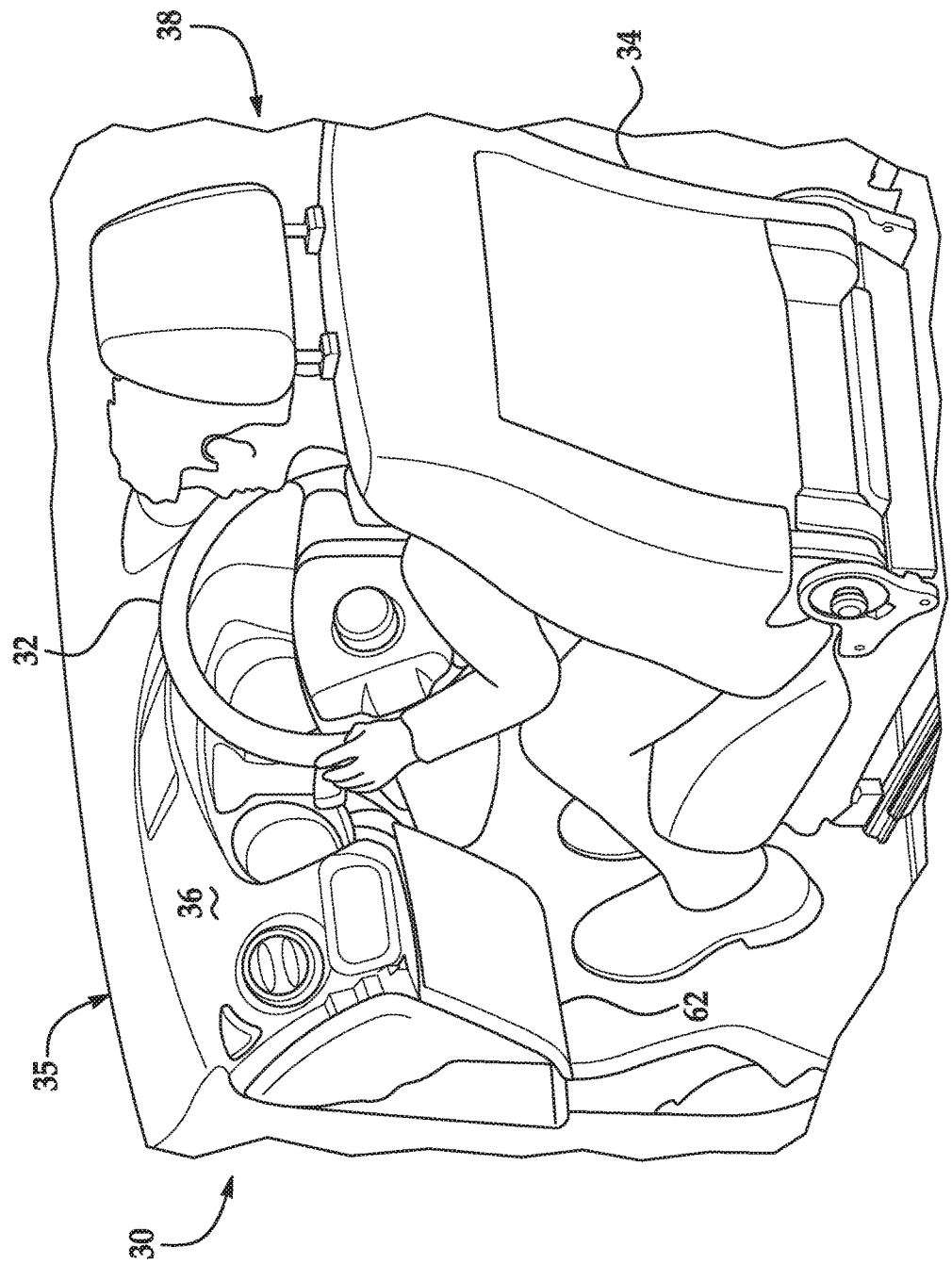
FIG. 1 is a perspective view of a passenger cabin of a vehicle.

With reference to FIG. 1, a vehicle 30 includes a passenger cabin 32 to house occupants, if any, of the vehicle 30. The passenger cabin 32 includes one or more front seats 34 disposed at a front of the passenger cabin 32 and one or more back seats (not shown) disposed behind the front seats 34. The passenger cabin 32 may also include third-row seats (not shown) at a rear of the passenger cabin 32. In FIG. 1, the front seat 34 is shown to be a bucket seat, but the seats may be other types. The position and orientation of the seats and components thereof may be adjustable by an occupant.

Figure 2:
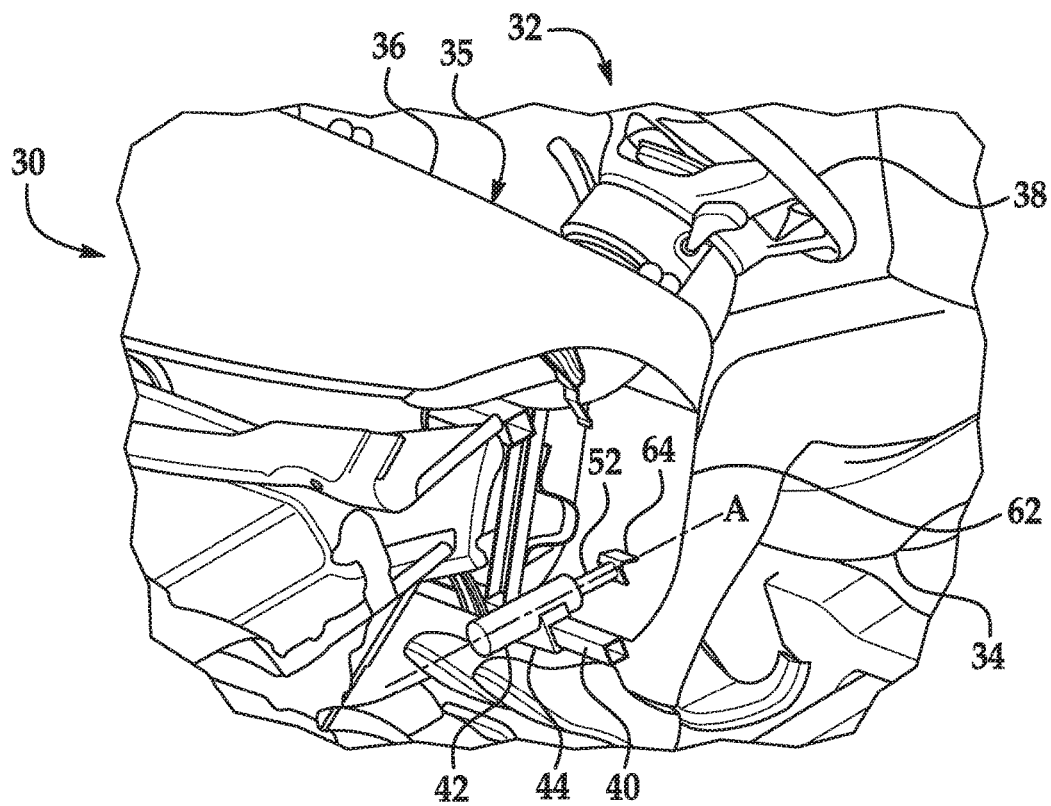
FIG. 2 is a perspective view of the passenger cabin with a side panel of an instrument panel removed for illustration.

With reference to FIGS. 1 and 2, an instrument panel 35 may be disposed at a forward end of the passenger cabin 32 and face toward the front seats 34. The instrument panel 35 may include a crossbeam 40; vehicle controls, such as a steering wheel 38; gauges, dials, and information displays; heating and ventilation equipment; a radio and other electronics; and an instrument-panel cover 36. The instrument panel 35 may extend laterally fully across the passenger cabin 32.

The instrument-panel cover 36 extends over and covers other components of the instrument panel 35. The instrument-panel cover 36 may extend above other components of the instrument panel 35 and between other components of the instrument panel 35 and the front seats 34. The instrument-panel cover 36 may extend a full length of the instrument panel 35. The instrument-panel cover 36 may be formed of plastic such as polypropylene or vinyl and may include trim elements formed of other materials.

With reference to FIG. 2, a crossbeam 40 may extend below and/or behind the instrument-panel cover 36. The crossbeam 40 may be a part of a frame of the vehicle 30. The crossbeam 40 may provide lateral structural support for the vehicle 30. The crossbeam 40 may extend laterally fully across the passenger cabin 32. Other components, such as the instrument-panel cover 36 or vehicle controls, may be mounted to the crossbeam 40. The crossbeam 40 may have a tubular shape with, e.g., a rectangular or square cross-section. The crossbeam 40 may be formed of steel, aluminum, etc.

A cylinder 42 is fixed relative to the crossbeam 40. The cylinder 42 may be attached to the crossbeam 40. For example, a cylinder bracket 44 may be directly attached to the cylinder 42 and to the crossbeam 40. The cylinder 42 may be welded to the cylinder bracket 44. The cylinder bracket 44 may be welded, fastened, etc. to the crossbeam 40.

With continued reference to FIG. 2, the cylinder 42 may be disposed below the instrument-panel cover 36. The cylinder 42 may be disposed below the steering wheel 38. The cylinder 42 may be located in a vehicle-forward direction from one of the front seats 34. The front seat 34 may face the cylinder 42. The cylinder 42 may be located in a vehicle-forward direction from a knee of an occupant of the seat, assuming the occupant is approximately the size of a 50th percentile anthropomorphic testing device. The cylinder 42 may define an axis A that is oriented in a vehicle-forward direction.

Figure 3:
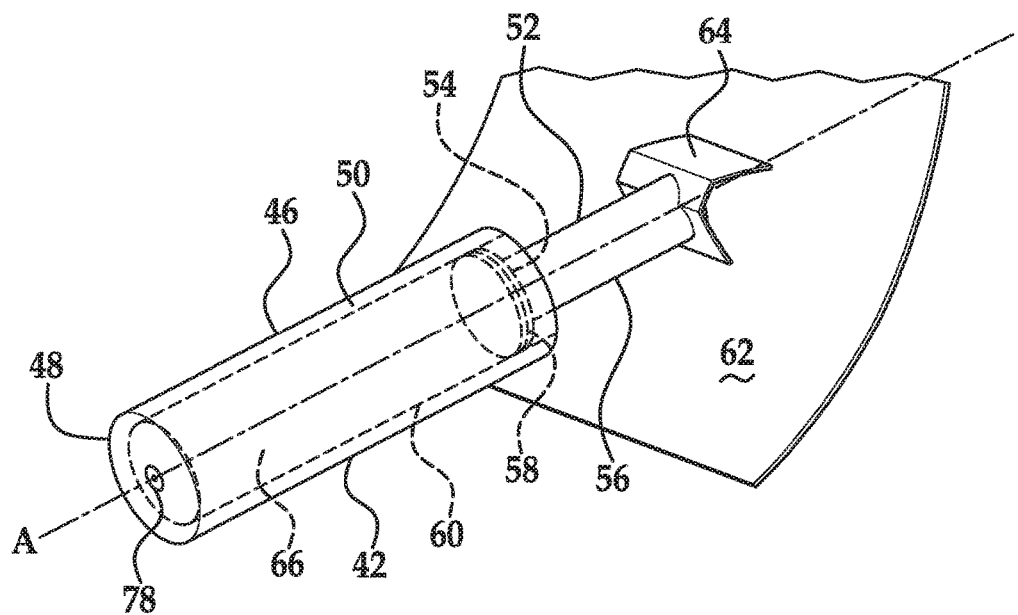
FIG. 3 is a perspective view of a cylinder, piston, and panel of the vehicle.

With reference to FIG. 3, the cylinder 42 may have a tube 46 and a wall 48 at an end of the tube 46. The tube 46 may have a constant cross-section along the axis A. The tube 46 may have a circular cross-section. The wall 48 may have a circular shape and may enclose one end of the tube 46.

The cylinder 42 has a chamber 50. The tube 46 and the wall 48 may define the chamber 50. The chamber 50 may have a constant cross-section along the axis A. The chamber 50 may have a circular cross-section.

A piston 52 may include a piston head 54 and a bar 56 extending from the piston head 54. The piston head 54 may have a circular cross-section with a diameter slightly smaller than a diameter of the chamber 50. The piston head 54 may be positioned in the chamber 50 and may enclose the chamber 50. The piston head 54 and the chamber 50 may define a sealed volume 60. An o-ring 58 may extend around the piston head 54. The o-ring 58 may form a seal between the piston head 54 and the tube 46 of the cylinder 42. The bar 56 may extend from the piston head 54 to a panel 62.

With continued reference to FIG. 3, the piston 52 may be linearly movable in the chamber 50. The piston 52 may be movable along the axis A. The piston 52 may be movable from a first position, as shown in FIG. 3, to a second position. The sealed volume 60 is smaller when the piston 52 is in the second position than in the first position.

With reference to FIGS. 1-3, the instrument panel 35 may include the panel 62. The panel 62 may be formed of, e.g., plastic such as polypropylene. The panel 62 may be formed of the same material as the instrument-panel cover 36 and may provide a uniform look and feel with the instrument-panel cover 36. The panel 62 may be directly connected to the instrument-panel cover 36. For example, the panel 62 may be connected to the instrument-panel cover 36 via clips, fasteners, etc. For another example, the panel 62 may be connected to the instrument-panel cover 36 via a living hinge along one edge and tear seams along some or all remaining edges. Alternatively, the panel may not be directly connected to the instrument-panel cover 36.

With reference to FIGS. 2 and 3, the panel 62 is fixed relative to the piston 52. The panel 62 may be attached to the piston 52. For example, the panel 62 may be fastened to the bar 56 of the piston 52. For another example, a panel bracket 64 may connect the bar 56 and the panel 62. The bar 56 may be, e.g., fastened to the panel bracket 64, and the panel bracket 64 may be, e.g., adhered to or integral with the panel 62. The bar 56 may extend transversely from the panel 62.

With reference to FIGS. 1 and 2, the panel 62 may be disposed between the piston 52 and the front seat 34. The panel 62 may face the front seat 34. The panel 62 may be located in a vehicle-forward direction from one of the front seats 34. The front seat 34 may face the panel 62. The panel 62 may be located in a vehicle-forward direction with a knee of an occupant of the seat, assuming the occupant is approximately the size of a 50th percentile anthropomorphic testing device.

With reference to FIG. 3, a heterogeneous mixture 66 is enclosed by the piston 52 in the chamber 50. In other words, the chamber 50 and the piston 52 contain the heterogeneous mixture 66 and prevent the heterogeneous mixture 66 from freely flowing out of the chamber 50. The heterogeneous mixture 66 may fill the sealed volume 60; in other words, the sealed volume 60 may contain only the heterogeneous mixture 66.

Figure 4A:
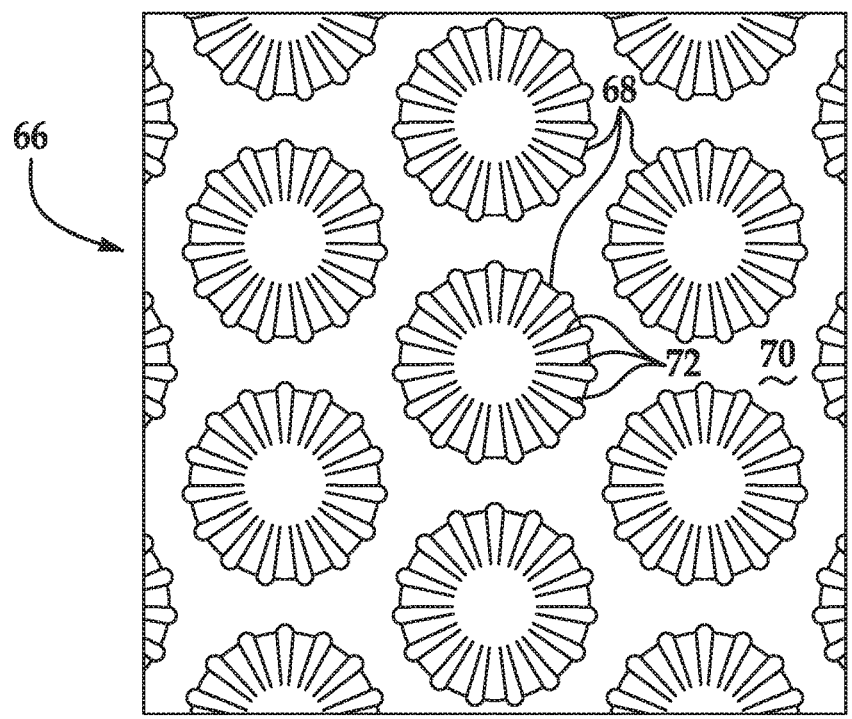
FIG. 4A is a diagram of a heterogeneous mixture when uncompressed.
Figure 4B:
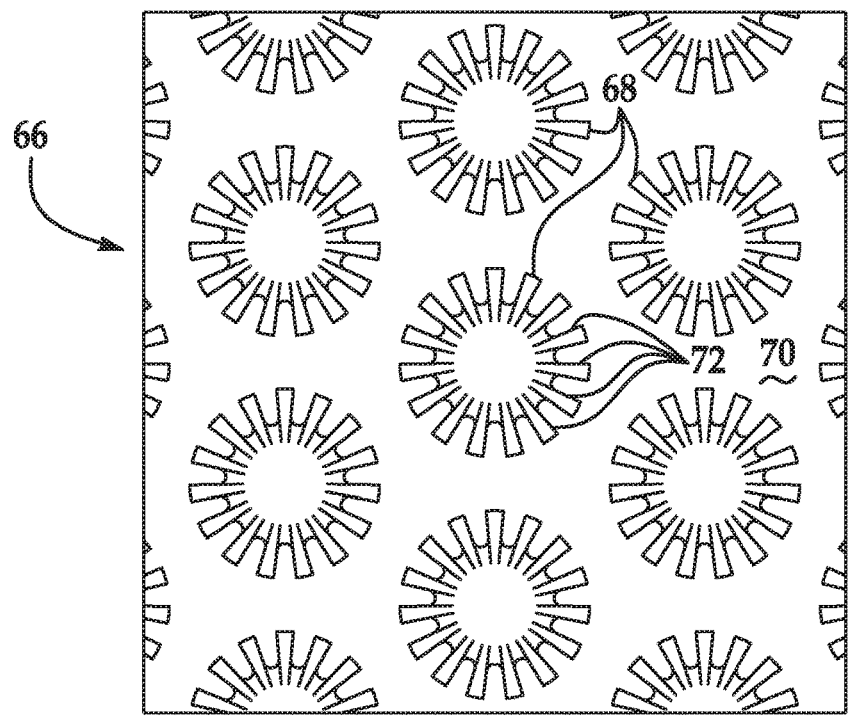
FIG. 4B is a diagram of the heterogeneous mixture when compressed.

With reference to FIGS. 4A-B, the heterogeneous mixture 66 includes hydrophobic nanoporous particles 68 and a liquid 70. A "heterogeneous mixture" is made of different substances that remain separate, e.g., a colloid or a suspension. For example, the heterogeneous mixture 66 may be a colloid of the hydrophobic nanoporous particles 68 in the liquid 70. The liquid 70 may be any inert, i.e., nonreactive, liquid, e.g., water, lithium chloride, etc.

The particles 68 are nanoporous; in other words, the particles 68 have nanopores 72. The nanopores 72 may have diameters on the order of 1 nm to 100 nm. The particles 68 may be formed of, e.g., silica. The particles 68 are hydrophobic, that is, tending to repel water or fail to mix with water. The particles 68 may be formed of a material that is hydrophobic, or the particles 68 may have a hydrophobic surface treatment, e.g., chlorotrimethylsilane or chlorodimethyloctylsilane in toluene.

Figure 5:
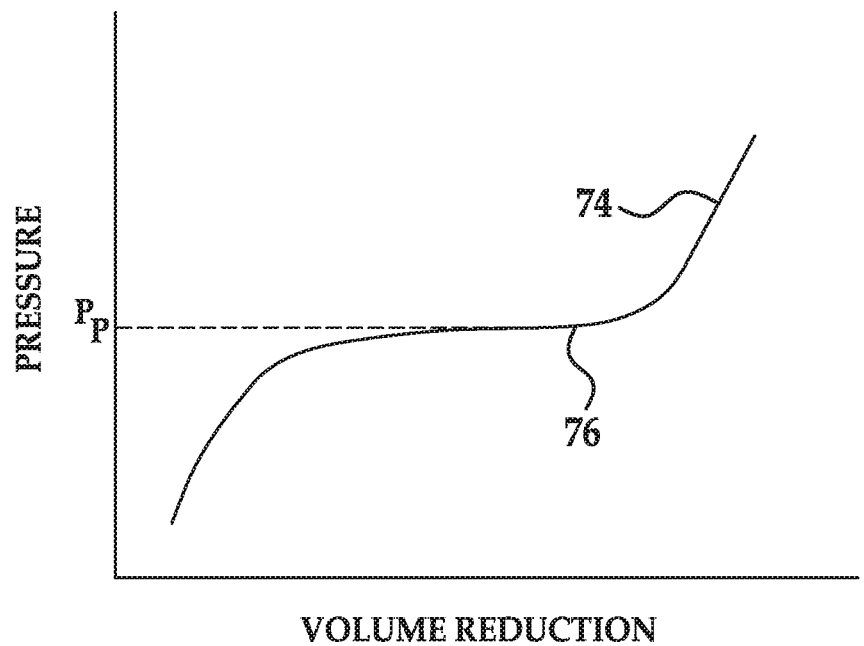
FIG. 5 is a graph of pressure in the heterogeneous mixture versus volume reduction.

FIG. 5 is a graph of a curve 74 describing the relationship between a volume reduction of the heterogeneous mixture 66 and the pressure experienced by the heterogeneous mixture 66. As a volume occupied by the heterogeneous mixture 66 decreases, the pressure initially increases relatively steeply. As the volume continues to decrease, the pressure nears a plateau pressure $P_P$ and does not increase or increases only relatively slowly, as shown over a plateau region 76 of the curve 74. Over the plateau region 76, the slope of the curve 74, that is, the rate of change of pressure per unit of volume reduction, is less than the slope of other regions of the curve 74. The plateau pressure $P_P$ may be at an inflection point of the curve 74 in the plateau region 76, that is, the point at which a change in the direction of curvature of the curve 74 occurs, that is, a point separating a region of the curve 74 with decreasing slope from a region of the curve 74 with increasing slope. After the plateau region 76, as the volume continues to decrease, the pressure rises more quickly than in the plateau region 76.

With reference to FIGS. 4A-B, physically, before the volume reduces, air fills the nanopores 72 of the particles 68, and surface tension prevents the liquid 70 from entering the nanopores 72, as shown in FIG. 4A. In the plateau region 76, the pressure becomes sufficient to overcome the surface tension, and the liquid 70 enters the nanopores 72 and compresses the air inside the nanopores 72, as shown in FIG. 4B. Once the nanopores 72 are mostly full of the liquid 70, as the volume reduces, the pressure increases more substantially. The volume may be reduced by as much as 80%. The plateau pressure $P_P$ and the length of the plateau region 76 are affected by the choice of material for the particles 68, the average size of the particles 68, the number of nanopores 72 per particle 68, the average size of the nanopores 72, the surface treatment, and the choice of liquid 70.

The piston 52 is movable from the first position in which the nanopores 72 are substantially filled with air to the second position in which the nanopores 72 are substantially filled with the liquid 70. The volume of the heterogeneous mixture 66 when the piston 52 is in the second position may be at most half of the volume, i.e., half or less than half of the volume, e.g., as little as 20% of the volume, of the heterogeneous mixture 66 when the piston 52 is in the first position. As the piston 52 moves from the first position to the second position, the pressure in the heterogeneous mixture 66 follows the curve 74 in FIG. 5; because the chamber 50 has a constant cross-sectional area, the distance traveled by the piston 52 is linearly related to the volume reduction.

The chamber 50 may lack outlets; in other words, no routes are provided for the heterogeneous mixture 66 to escape the chamber 50. The compression of the heterogeneous mixture 66 may be partially or fully reversible. As the pressure decreases, the air compressed in the nanopores 72 expands, and the volume occupied by the heterogeneous mixture 66 expands.

Alternatively, with reference to FIG. 3, the cylinder 42 may have an orifice 78 between the chamber 50 and a space outside the cylinder 42. Specifically, the orifice 78 may be in the wall 48. A secondary chamber (not shown) may extend around the orifice. The secondary chamber may retain the heterogeneous mixture 66 that exits the chamber 50 through the orifice 78. Orifice is optional.

The orifice 78 may have a pressure threshold $P_T$. When the liquid 70 is below the pressure threshold $P_T$, the orifice 78 blocks the liquid 70 from passing through the orifice 78. When the liquid 70 is above the pressure threshold $P_T$, the orifice 78 allows the liquid 70 in the chamber 50 to pass through the orifice 78. The pressure threshold $P_T$ may be passed shortly after volume is reduced out of the plateau region 76. The pressure threshold $P_T$ may be greater than the plateau pressure $P_P$. The pressure threshold $P_T$ may be greater than a pressure required to compress the heterogeneous mixture 66 to half its original volume.

Figure 6:
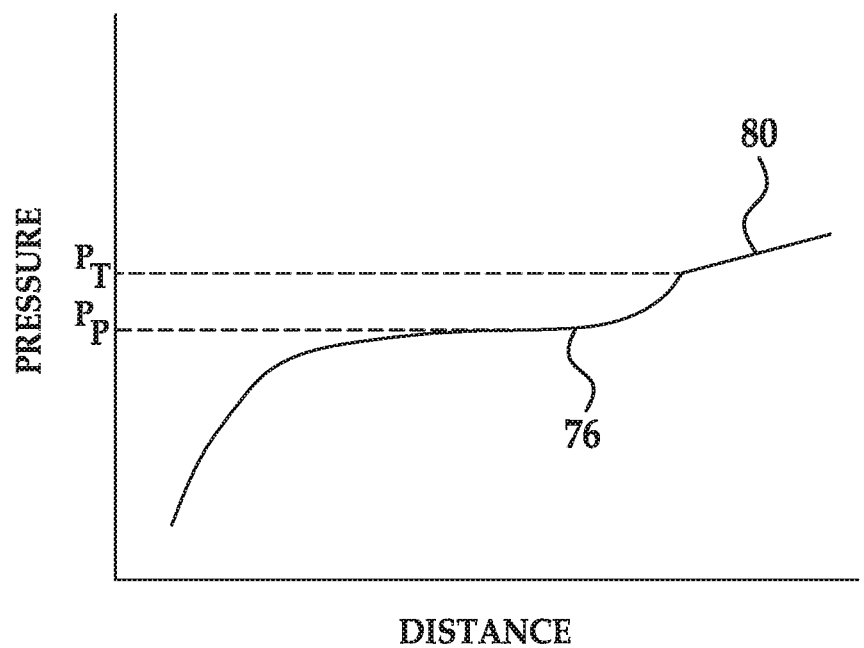
FIG. 6 is a graph of pressure in the heterogeneous mixture versus stroke distance of the piston when the cylinder has an orifice.

In the event of a frontal impact, an occupant of the front seat 34 has forward momentum relative to the rest of the vehicle 30. The forward motion of the occupant may be limited by restraint systems such as seatbelts or airbags (not shown). A knee of the occupant may impact the panel 62. As the knee pushes the panel 62 forward, the piston 52 strokes in the cylinder 42 and compresses the heterogeneous mixture 66. The piston 52 moves from the first position toward the second position. FIG. 5 shows the curve 74 of the pressure as a function of volume reduction, which is linearly related to stroke distance, if the cylinder 42 lacks the orifice 78. FIG. 6 shows a curve 80 of the pressure as a function of stroke distance of the piston 52, if the cylinder 42 includes the orifice. In the plateau region 76 of the curves 74, 80, the rise of the reaction force from the panel 62 to the knee is limited by the plateau pressure $P_P$. Above the plateau region 76, if the cylinder 42 includes the orifice 78, the rise of the reaction force from the panel 62 to the knee is additionally limited by the pressure threshold $P_T$ of the orifice 78 as the orifice 78 releases the liquid 70 from the cylinder 42. If the cylinder 42 lacks the orifice 78 or if the pressure exerted on the heterogeneous mixture 66 stayed below the pressure threshold $P_T$ of the orifice 78, then once the force on the panel 62 is removed, the piston 52 moves back toward the first position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle component comprising:
   a crossbeam;
   a cylinder having a chamber and fixed relative to the crossbeam;
   a piston linearly movable in the chamber;
   a panel fixed relative to the piston; and
   a heterogeneous mixture enclosed by the piston in the chamber, the heterogeneous mixture including hydrophobic nanoporous particles and a liquid;
   wherein the cylinder has an orifice between the chamber and a space outside the cylinder; and
   the orifice allows the liquid in the chamber to exit the chamber through the orifice when the liquid is above a fixed pressure threshold and blocks the liquid in the chamber from exiting the chamber when the liquid is below the fixed pressure threshold.

2. The vehicle component of claim 1, wherein the heterogeneous mixture is a colloid of hydrophobic nanoporous particles in a liquid.

3. The vehicle component of claim 1, wherein the cylinder is attached to the crossbeam.

4. The vehicle component of claim 1, further comprising an instrument-panel cover fixed relative to the crossbeam, wherein the cylinder is disposed below the instrument-panel cover.

5. The vehicle component of claim 1, further comprising a seat, wherein the panel is disposed between the piston and the seat.

6. The vehicle component of claim 1, wherein the panel is attached to the piston.

7. The vehicle component of claim 1, wherein the fixed pressure threshold is greater than a pressure required to compress the heterogeneous mixture to half of an original volume of the heterogeneous mixture.

8. The vehicle component of claim 1, wherein the cylinder has a tube and a wall at an end of the tube, and the orifice is in the wall.

9. The vehicle component of claim 1, wherein the particles have nanopores, and the piston is movable from a first position in which the nanopores are substantially filled with air to a second position in which the nanopores are substantially filled with the liquid.

10. The vehicle component of claim 9, wherein a volume of the heterogeneous mixture when the piston is in the second position is at most half of a volume of the heterogeneous mixture when the piston is in the first position.

11. The vehicle component of claim 1, wherein the particles are formed of silica.

12. The vehicle component of claim 11, wherein the particles have a hydrophobic surface treatment.

* * * * *